US012570783B2

(12) United States Patent     (10) Patent No.: US 12,570,783 B2
Hou et al.     (45) Date of Patent: Mar. 10, 2026

(54) STYRENE ACRYLATE-SILOXANE COMPOSITE EMULSION WITH CORE-SHELL STRUCTURE, AND PREPARATION METHOD AND USE THEREOF

(71) Applicant: Qingdao University of Technology, Qingdao (CN)

(72) Inventors: Dongshuai Hou, Qingdao (CN); Cong Wu, Qingdao (CN); Bing Yin, Qingdao (CN); Shaochun Li, Qingdao (CN); Xinpeng Wang, Qingdao (CN); Pan Wang, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 635 days.

(21) Appl. No.: 17/928,012

(22) PCT Filed: Jan. 19, 2022

(86) PCT No.: PCT/CN2022/072647

§ 371 (c)(1),
(2) Date: Nov. 28, 2022

(87) PCT Pub. No.: WO2023/123579

PCT Pub. Date: Jul. 6, 2023

(65) Prior Publication Data

US 2024/0228686 A1     Jul. 11, 2024

(30) Foreign Application Priority Data

Dec. 28, 2021    (CN) .......................... 202111625303.9

(51) Int. Cl.
    *C09D 5/08*       (2006.01)
    *C08F 265/06*     (2006.01)
    *C09D 151/00*    (2006.01)
(52) U.S. Cl.
    CPC .............. *C08F 265/06* (2013.01); *C09D 5/08* (2013.01); *C09D 151/003* (2013.01)

(58) Field of Classification Search
    CPC .... C08F 265/06; C08F 2/26; C08F 220/1804; C08F 257/02; C08F 212/08; C08F 230/08; C09D 5/08; C09D 151/003; C09D 151/00
    USPC ......................................................... 523/201
    See application file for complete search history.

(56) References Cited

U.S. PATENT DOCUMENTS

| | | |
|---|---|---|
| 10,287,386 B2 | 5/2019 | Su et al. |
| 2016/0017171 A1* | 1/2016 | Li .......................... C08F 220/00 |
| | | 523/435 |
| 2019/0031807 A1 | 1/2019 | Su et al. |

FOREIGN PATENT DOCUMENTS

| | | |
|---|---|---|
| CN | 101649153 A | 2/2010 |
| CN | 104277172 A | 1/2015 |
| WO | 2020170272 A1 | 8/2020 |

OTHER PUBLICATIONS

International Search Report for PCT/CN2022/072647 dated Aug. 29, 2022.
Yin, Bing; "Research and application progress of nano-modified coating in improving the durability of cement-based materials"; Progress in Organic Coatings 2021; 24(9):161.

* cited by examiner

*Primary Examiner* — Hannah J Pak

(74) *Attorney, Agent, or Firm* — Notaro, Michalos & Zaccaria P.C.

(57) ABSTRACT

The present disclosure provides a styrene acrylate-siloxane composite emulsion with a core-shell structure, and a preparation method and use thereof, and relates to the technical field of protective coatings. In the present disclosure, a core emulsion is prepared through two-step emulsification with styrene, an acrylate monomer, a first emulsifying agent, a first initiator, a second initiator, an alkaline reagent, and water as raw materials; then a shell emulsion is prepared with a siloxane monomer, a hydroxyl-containing acrylate monomer, an emulsifying agent, and water as raw materials; and then the core emulsion, the shell emulsion, and an initiator are subjected to a grafting reaction to obtain the styrene acrylate-siloxane composite emulsion with a core-shell structure.

16 Claims, 3 Drawing Sheets

Example 1  Example 2    Example 3    Example 4    Comparative    Comparative    Comparative
                                                  Example 1      Example 2      Example 3

Example 1              Example 2              Example 3              Example 4

Comparative            Comparative            Comparative
Example 1              Example 2              Example 3

Example 1        Example 2        Example 3        Example 4

Comparative      Comparative      Comparative
Example 1        Example 2        Example 3

STYRENE ACRYLATE-SILOXANE COMPOSITE EMULSION WITH CORE-SHELL STRUCTURE, AND PREPARATION METHOD AND USE THEREOF

CROSS REFERENCE TO RELATED APPLICATION

The present application claims priority to Chinese Patent Application No. CN202111625303.9 filed to the China National Intellectual Property Administration (CNIPA) on Dec. 28, 2021 and entitled "STYRENE ACRYLATE-SILOXANE COMPOSITE EMULSION WITH CORE-SHELL STRUCTURE, AND PREPARATION METHOD AND USE THEREOF", which is incorporated herein by reference in its entirety.

TECHNICAL FIELD

The present disclosure relates to the technical field of protective coatings, and in particular to a styrene acrylate-siloxane composite emulsion with a core-shell structure, and a preparation method and use thereof.

BACKGROUND

In a coastal environment, the corrosion resistance of a cement-based material determines the overall safety and durability of a concrete structure, and a cement substrate can be subjected to a surface treatment with an efficient and eco-friendly composite anti-corrosion coating to significantly improve the water resistance and corrosion resistance of a concrete material.

Surface film-formed styrene-acrylate coatings and penetrating siloxane coatings are two classes of most common polymer anticorrosive coatings. Styrene-acrylate coatings have excellent chemical corrosion resistance, low cost, high weather resistance, and high insulation, but poor leveling performance, poor environmental stability, poor water resistance, and weak adhesion, which greatly affect a protective effect for cement-based materials, siloxane coatings have advantages such as high hydrophobicity, high leveling performance, high permeability, and strong adhesion, but the high cost limits the extensive application of siloxane coatings in surface protection engineering. Since styrene-acrylate coatings and siloxane coatings can make up for each other's shortcomings, the preparation of styrene acrylate-siloxane composite protective coatings can make cement-based materials significantly resistant to seawater, salt spray, acid, and alkali corrosion and can effectively slow down the corrosion of internal steel bars and steel skeletons. A styrene acrylate-siloxane coating is currently prepared through addition polymerization, which can only lead to a styrene acrylate-siloxane composite emulsion, but cannot lead to a styrene acrylate-siloxane emulsion with a core-shell structure.

SUMMARY

In view of this, the present disclosure is intended to provide a styrene acrylate-siloxane composite emulsion with a core-shell structure, and a preparation method and use thereof. The preparation method provided by the present disclosure can prepare a styrene acrylate-siloxane composite emulsion with a core-shell structure.

To achieve the above objective of the present disclosure, the present disclosure provides the following technical solutions.

The present disclosure provides a preparation method of a styrene acrylate-siloxane composite emulsion with a core-shell structure, including the following steps:

(1) mixing styrene, an acrylate monomer, a first emulsifying agent, a first initiator, and water to obtain a styrene-acrylate pre-emulsion; and premixing a part of the styrene-acrylate pre-emulsion with an alkaline reagent, adding the remaining styrene-acrylate pre-emulsion and a second initiator, and mixing to obtain a styrene-acrylate core emulsion;

(2) mixing a siloxane monomer, a hydroxyl-containing acrylate monomer, a second emulsifying agent, and water, and conducting a hydrolysis-polycondensation reaction to obtain a hydroxyl-containing acrylate-siloxane shell emulsion; and (3) mixing the styrene-acrylate core emulsion, the hydroxyl-containing acrylate-siloxane shell emulsion, and a third initiator, and conducting a grafting reaction to obtain the styrene acrylate-siloxane composite emulsion with a core-shell structure;

where steps (1) and (2) are conducted in any order.

Preferably, the acrylate monomer includes one or more selected from the group consisting of methyl acrylate (MA), methyl methacrylate (MMA), ethyl acrylate (EA), butyl acrylate (BA), butyl methacrylate (BMA), and acrylic acid.

Preferably, a mass of the styrene is 10% to 30% of a total mass of the styrene and the acrylate monomer.

Preferably, the first emulsifying agent includes one or more selected from the group consisting of OP-10, sodium dodecyl sulfate, sodium dodecyl sulfonate, and sodium dodecyl benzene sulfonate (SDBS), and a mass of the first emulsifying agent is 2% to 5% of a total mass of the styrene and the acrylate monomer.

Preferably, the first initiator includes one or more selected from the group consisting of a persulfate, azodiisobutyronitrile (AIBN), and dimethyl azobisisobutyrate, and a mass of the first initiator is 0.2% to 0.7% of a mass of the styrene-acrylate pre-emulsion.

Preferably, a mass of the part of the styrene-acrylate pre-emulsion is 10% to 30% of a total mass of the styrene-acrylate pre-emulsion.

Preferably, the second initiator includes one or more selected from the group consisting of a persulfate, AIBN, and dimethyl azobisisobutyrate, and a mass of the second initiator is 0.3% to 0.8% of a mass of the styrene-acrylate pre-emulsion.

Preferably, the siloxane monomer includes one or more selected from the group consisting of octyl siloxane, dodecyl siloxane, and cetyl siloxane.

Preferably, the octyl siloxane includes n-octyltrimethoxysiloxane and/or n-octyltriethoxysiloxane, the dodecyl siloxane includes dodecyltrimethoxysiloxane and/or dodecyltriethoxysiloxane, and the cetyl siloxane includes cetyltrimethoxysiloxane and/or cetyltriethoxysiloxane.

Preferably, the hydroxyl-containing acrylate monomer includes hydroxyethyl acrylate (HEA) and/or hydroxypropyl acrylate (HPA); and a mass of the hydroxyl-containing acrylate monomer is 20% to 50% of a mass of the siloxane monomer.

Preferably, the second emulsifying agent includes one or more selected from the group consisting of OP-10, sodium dodecyl sulfate, Peregal O, Span 60, Span 80, Tween 60, and Tween 80, and a mass of the second emulsifying agent is 5% to 15% of a total mass of the siloxane monomer and the hydroxyl-containing acrylate monomer.

Preferably, the hydrolysis-polycondensation reaction is conducted at 30° C. to 50° C. for 1 h to 6 h.

Preferably, a mass ratio of the styrene-acrylate core emulsion to the hydroxyl-containing acrylate-siloxane shell emulsion is 1:(1-5).

Preferably, the third initiator includes one or more selected from the group consisting of a persulfate, AIBN, and dimethyl azobisisobutyrate, and a mass of the third initiator is 0.2% to 0.5% of a mass of the hydroxyl-containing acrylate-siloxane shell emulsion.

Preferably, the grafting reaction is conducted at 80° C. to 85° C. for 1.5 h to 3 h.

The present disclosure provides a styrene acrylate-siloxane composite emulsion with a core-shell structure prepared by the preparation method described in the above technical solution, including an emulsion particle, where the emulsion particle includes a styrene-acrylate core, a hydroxyl-containing acrylate grafting layer located on a surface of the styrene-acrylate core, and a siloxane shell located on a surface of the hydroxyl-containing acrylate grafting layer.

The present disclosure provides a preparation method of a styrene acrylate-siloxane composite emulsion with a core-shell structure, including the following steps: (1) mixing styrene, an acrylate monomer, a first emulsifying agent, a first initiator, and water to obtain a styrene-acrylate pre-emulsion; and premixing a part of the styrene-acrylate pre-emulsion with an alkaline reagent, adding the remaining styrene-acrylate pre-emulsion and a second initiator, and mixing to obtain a styrene-acrylate core emulsion; (2) mixing a siloxane monomer, a hydroxyl-containing acrylate monomer, a second emulsifying agent, and water, and conducting a hydrolysis-polycondensation reaction to obtain a hydroxyl-containing acrylate-siloxane shell emulsion; and (3) mixing the styrene-acrylate core emulsion, the hydroxyl-containing acrylate-siloxane shell emulsion, and a third initiator, and conducting a grafting reaction to obtain the styrene acrylate-siloxane composite emulsion with a core-shell structure; where steps (1) and (2) are conducted in any order. In the preparation method provided by the present disclosure, the introduction of the hydroxyl-containing acrylate monomer can effectively improve a grafting effect of the styrene-acrylate core structure to the siloxane shell structure, improve a synergistic effect between the styrene-acrylate core structure and the siloxane shell structure, and make the composite emulsion with a core-shell structure exhibit excellent hydrophobicity, water resistance, stability, adhesion, ion penetration resistance, acid and alkali corrosion resistance, and aging resistance.

The present disclosure provides a styrene acrylate-siloxane composite emulsion with a core-shell structure prepared by the preparation method described in the above technical solution, including an emulsion particle, where the emulsion particle includes a styrene-acrylate core, a hydroxyl-containing acrylate grafting layer located on a surface of the styrene-acrylate core, and a siloxane shell located on a surface of the hydroxyl-containing acrylate grafting layer.

The styrene acrylate-siloxane composite emulsion with a core-shell structure provided by the present disclosure has the following properties:

(1) The styrene acrylate-siloxane composite emulsion with a core-shell structure has excellent hydrophobicity and water resistance. A large number of siloxane molecules are grafted to the styrene-acrylate core structure through the hydroxyl-containing acrylate in the composite emulsion with a core-shell structure, which greatly improves the dispersity and stability of emulsion particles. The long hydrophobic hydrocarbon chains in siloxane molecules in the outer layer can orderly and fully stretch and move freely in the hydration layer of emulsion particles. During a film-forming process of the composite emulsion with a core-shell structure provided by the present disclosure, after the free water and a part of the bound water in the composite emulsion with a core-shell structure on a surface of a cement-based material are evaporated, the emulsion particles will gradually aggregate on the surface of the cement-based material to form a stable and relatively-dense insulating protective film with superior hydrophobicity and water resistance. The emulsion particles with a relatively-small particle size will penetrate into the cement-based material through micropores, and the siloxane molecules will form a stable hydrophobic layer in calcium silicate hydrate gel pores of the cement-based material, thereby inhibiting the diffusion and transport of water molecules in the external environment.

(2) The styrene acrylate-siloxane composite emulsion with a core-shell structure can show stable and prominent adhesion to a surface of a cement substrate. In the composite emulsion with a core-shell structure, the styrene-acrylate core structure can fully improve the configuration and space state of siloxane molecules in the outer layer, which promotes the further hydrolysis of siloxane molecules and increases the number of silanol groups in the emulsion particle structure. Due to the prominent stability of emulsion particles in the composite emulsion with a core-shell structure, free-swimming silanol groups outside the emulsion particles can fully react with silanol groups in a cement hydration product (that is, a further adequate secondary hydration reaction occurs), which enhances a bonding effect between the composite emulsion with a core-shell structure and the cement substrate. Moreover, the strong adsorption and penetration ability of siloxane molecules in the shell structure increases a capillary force between styrene acrylate-siloxane cores and aggravates the evaporation of surrounding free water during a film-forming process, thereby inducing the emulsion particles to be stably adsorbed on a surface of a cement-based material.

(3) The styrene acrylate-siloxane composite emulsion with a core-shell structure exhibits excellent resistance to chloride and sulfate corrosion. The composite emulsion with a core-shell structure can not only form a relatively-dense protective film on a surface of a cement-based material to isolate aggressive ions, but also penetrate into gel pores of the cement-based material to form a stable hydrophobic layer. The styrene acrylate-siloxane composite core-shell structure can enhance the crosslinking and bonding of emulsion particles, give full play to the hydrophobicity and surface adhesion of siloxane molecules, and weaken the diffusion and transmission of water molecules and aggressive ions such as chloride ions and sulfate ions on a surface of a cement-based material and inside capillary channels.

(4) The styrene acrylate-siloxane composite emulsion with a core-shell structure can provide excellent corrosion resistance for steel bars. A surface insulating film and an internal hydrophobic permeable layer formed by the composite emulsion with a core-shell structure can inhibit the diffusion of $CO_2$ in capillary pores of a cement-based material (such as concrete), maintain an alkaline environment inside a cement-based material, protect a passivation film on a surface of a steel bar, effectively inhibit the diffusion and transmission of chloride ions inside a cement-based material, and reduce the corrosion of chloride ions and sulfate ions to a steel bar. The core-shell structure can improve the steric hindrance of styrene-acrylate and siloxane components and the stability of the outer electric double layer, and enhance the repulsion and inhibition for aggressive ions. In addition, the core-shell structure will improve the crosslinking degree and non-bonding interaction between the styrene-acrylate component and the siloxane component and increase the resistivity of a composite coating, such that a composite emulsion coating with a core-shell structure has superior electrochemical performance. The high resistivity can effectively inhibit the diffusion and migration of aggressive ions in the composite coating.

(5) The styrene acrylate-siloxane composite emulsion with a core-shell structure is applicable to various types of cement-based materials such as concrete. The composite emulsion with a core-shell structure has excellent leveling performance and permeability, and the core-shell structure can also endow siloxane molecules in the emulsion with high molecular reactivity. Thus, the styrene acrylate-siloxane composite emulsion with a core-shell structure can be used for various complex rough interfaces with strong bonding performance, and can form a stable and long-acting protective layer on surfaces of various cement-based materials.

(6) The styrene acrylate-siloxane composite emulsion with a core-shell structure has excellent aging resistance. The composite emulsion with a core-shell structure can promote the strong grafting, crosslinking, and bonding between the styrene-acrylate molecule and the siloxane molecule while ensuring the prominent anti-ultraviolet (UV) aging performance of the styrene-acrylate core structure, which improves the cooperative working performance of the two and the environmental adaptability. In addition, the composite emulsion with a core-shell structure has a high crosslinking density, which is also conducive to the realization of aging resistance of a coating against heat and radiation.

DETAILED DESCRIPTION OF THE EMBODIMENTS

Figure 1:
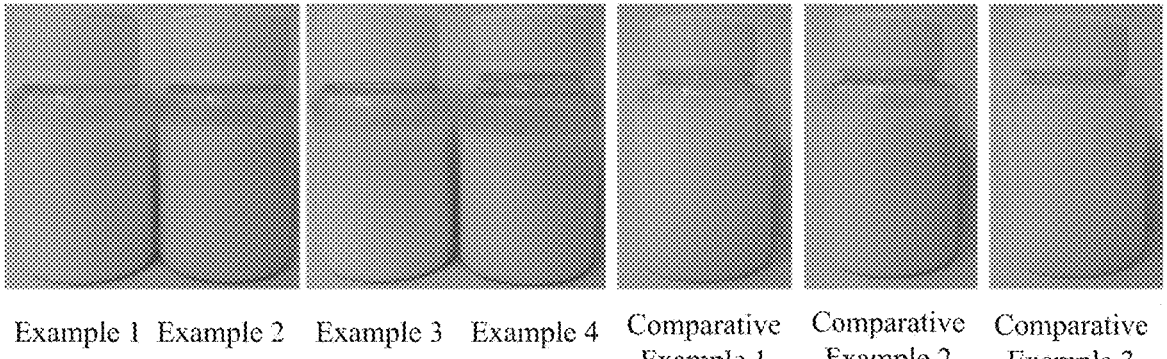
FIG. 1 shows appearance pictures of the emulsions prepared in Examples 1 to 4 and Comparative Examples 1 to 3.

The present disclosure is further described below with reference to the accompanying drawings and examples.

The present disclosure provides a preparation method of a styrene acrylate-siloxane composite emulsion with a core-shell structure, including the following steps:

(1) mixing styrene, an acrylate monomer, a first emulsifying agent, a first initiator, and water to obtain a styrene-acrylate pre-emulsion; and premixing a part of the styrene-acrylate pre-emulsion with an alkaline reagent, adding the remaining styrene-acrylate pre-emulsion and a second initiator, and mixing to obtain a styrene-acrylate core emulsion;

(2) mixing a siloxane monomer, a hydroxyl-containing acrylate monomer, a second emulsifying agent, and water, and conducting a hydrolysis-polycondensation reaction to obtain a hydroxyl-containing acrylate-siloxane shell emulsion; and (3) mixing the styrene-acrylate core emulsion, the hydroxyl-containing acrylate-siloxane shell emulsion, and a third initiator, and conducting a grafting reaction to obtain the styrene acrylate-siloxane composite emulsion with a core-shell structure;

where steps (1) and (2) are conducted in any order.

In the present disclosure, unless otherwise specified, all raw material components are commercially available products well known to those skilled in the art.

In the present disclosure, styrene, an acrylate monomer, a first emulsifying agent, a first initiator, and water are mixed to obtain a styrene-acrylate pre-emulsion.

In the present disclosure, the acrylate monomer preferably includes one or more selected from the group consisting of MA, MMA, EA, BA, BMA, and acrylic acid. In the present disclosure, a mass of the styrene is preferably 10% to 30%, more preferably 15% to 25%, and further more preferably 20% of a total mass of the styrene and the acrylate monomer.

In the present disclosure, the first emulsifying agent preferably includes one or more selected from the group consisting of OP-10, sodium dodecyl sulfate, sodium dodecyl sulfonate, and SDBS. In the present disclosure, a mass of the first emulsifying agent is preferably 2% to 5%, more preferably 2.5% to 4.5%, and further more preferably 3% to 4% of a total mass of the styrene and the acrylate monomer.

In the present disclosure, a total mass concentration of the styrene and the acrylate monomer in the styrene-acrylate pre-emulsion is preferably 30 wt % to 70 wt %, more preferably 30 wt % to 60 wt %, and further more preferably 35 wt % to 50 wt %. In the present disclosure, a ratio of a mass of the water to a total mass of the styrene and the acrylate monomer is preferably (1-2.5): 1 and more preferably (1.5-2):1.

In the present disclosure, the first initiator preferably includes one or more selected from the group consisting of a persulfate, AIBN, and dimethyl azobisisobutyrate; and the persulfate preferably includes one or more selected from the group consisting of sodium persulfate (SPS), ammonium persulfate (APS), and potassium persulfate (KPS). In the present disclosure, a mass of the first initiator is preferably 0.2% to 0.7%, more preferably 0.3% to 0.6%, and further more preferably 0.4% to 0.5% of a mass of the styrene-acrylate pre-emulsion. In the present disclosure, the first initiator is preferably used in the form of a first initiator aqueous solution, and the first initiator aqueous solution has a concentration of preferably 0.2 wt % to 1.0 wt %, more preferably 0.3 wt % to 0.7 wt %, and further more preferably 0.4 wt % to 0.5 wt %.

In a specific embodiment of the present disclosure, the mixing of the styrene, the acrylate monomer, the first emulsifying agent, the first initiator, and the water is preferably conducted as follows: the styrene and the acrylate monomer are mixed and stirred to obtain a styrene-acrylate monomer mixture; and then the first emulsifying agent is added to the water to obtain an emulsifying agent aqueous solution, the styrene-acrylate monomer mixture and the first initiator are added to the emulsifying agent aqueous solution, and a resulting mixture is further stirred. In the present disclosure, the styrene-acrylate monomer mixture has a glass transition temperature of preferably 0° C. to 25° C., more preferably 5° C. to 20° C., and further more preferably 10° C. to 15° C. In the present disclosure, the stirring is preferably conducted at room temperature. The present disclosure has no special limitation on a time of the stirring, as long as the raw materials can be thoroughly mixed. In the present disclosure, the further stirring is conducted at a temperature of preferably 70° C. to 80° C. more preferably 72° C. to 78° C., and further more preferably 75° C. to 76° C.; the further mixing is conducted for preferably 30 min to 90 min, more preferably 40 min to 70 min, and further more preferably 50 min to 60 min; and the further mixing is conducted at a stirring speed of preferably 300 r/min to 600 r/min, more preferably 350 r/min to 550 r/min, and further more preferably 400 r/min to 500 r/min. In the present disclosure, the above-mentioned mixing method can make the styrene and acrylate monomer emulsified preliminarily and enable high dispersity to obtain a relatively-stable styrene-acrylate emulsion system.

In the present disclosure, after the styrene-acrylate pre-emulsion is obtained, a part of the styrene-acrylate pre-emulsion is premixed with an alkaline reagent, the remaining styrene-acrylate pre-emulsion and a second initiator are added, and a resulting mixture is mixed to obtain a styrene-acrylate core emulsion.

In the present disclosure, the alkaline reagent is preferably used in the form of an alkaline reagent aqueous solution (a pH buffer solution); the buffer solution preferably includes one or more selected from the group consisting of a sodium bicarbonate solution, a sodium carbonate solution, a sodium hydrogen phosphate solution, a barbiturate buffer, a tris (hydroxymethyl)aminomethane solution, and an acetate buffer; and the alkaline reagent aqueous solution has a pH of preferably 7 to 8.5 and more preferably 7.5 to 8.

In the present disclosure, a mass of the part of the styrene-acrylate pre-emulsion is preferably 10% to 30%, more preferably 15% to 25%, and further more preferably 20% of a total mass of the styrene-acrylate pre-emulsion.

In the present disclosure, the premixing is conducted at a temperature of preferably 70° C. to 80° C., more preferably 72° C. to 78° C., and further more preferably 75° C. to 76° C. The present disclosure has no special limitation on a time of the premixing, as long as a bluish-white premixture is obtained after the premixing. In the present disclosure, the premixing is preferably achieved through stirring, and the stirring is conducted at a stirring speed of preferably 300 r/min to 600 r/min, more preferably 350 r/min to 550 r/min, and further more preferably 400 r/min to 500 r/min. In the present disclosure, the above-mentioned mixing method can make the styrene and acrylate monomer further emulsified and enable high dispersity to obtain a relatively-stable styrene-acrylate emulsion system.

In the present disclosure, the second initiator preferably includes one or more selected from the group consisting of a persulfate, AIBN, and dimethyl azobisisobutyrate. In the present disclosure, the persulfate preferably includes one or more selected from the group consisting of SPS, APS, and KPS. In the present disclosure, a mass of the second initiator is preferably 0.3% to 0.8%, more preferably 0.4% to 0.7%, and further more preferably 0.5% to 0.6% of a mass of the styrene-acrylate pre-emulsion. In the present disclosure, the second initiator is preferably used in the form of a second initiator aqueous solution, and the second initiator aqueous solution has a concentration of preferably 0.2 wt % to 1.0 wt %, more preferably 0.3 wt % to 0.7 wt %, and further more preferably 0.4 wt % to 0.5 wt %.

In the present disclosure, the mixing is conducted at a temperature of preferably 80° C. to 85° C., more preferably 81° C. to 84° C., and further more preferably 82° C. to 83° C. The present disclosure has no special limitation on a time of the mixing, as long as a bluish-white premixture is obtained after the premixing. In the present disclosure, the premixing is preferably achieved through stirring, and the stirring is conducted at a stirring speed of preferably 300 r/min to 600 r/min, more preferably 350 r/min to 550 r/min, and further more preferably 400 r/min to 500 r/min. In the present disclosure, the above-mentioned mixing method can make the styrene and acrylate monomer further emulsified and enable high dispersity to obtain a relatively-stable styrene-acrylate emulsion system.

In the present disclosure, a siloxane monomer, a hydroxyl-containing acrylate monomer, a second emulsifying agent, and water are mixed, and a hydrolysis-polycondensation reaction is conducted to obtain a hydroxyl-containing acrylate-siloxane shell emulsion.

In the present disclosure, the siloxane monomer preferably includes one or more selected from the group consisting of octyl siloxane, dodecyl siloxane, and cetyl siloxane. In the present disclosure, the octyl siloxane preferably includes n-octyltrimethoxysiloxane and/or n-octyltriethoxysiloxane, the dodecyl siloxane preferably includes dodecyltrimethoxysiloxane and/or dodecyltriethoxysiloxane, and the cetyl siloxane preferably includes cetyltrimethoxysiloxane and/or cetyltriethoxysiloxane.

In the present disclosure, the hydroxyl-containing acrylate monomer preferably includes HEA and/or HPA; and a mass of the hydroxyl-containing acrylate monomer is preferably 20% to 50%, more preferably 25% to 45%, and further more preferably 30% to 40% of a mass of the siloxane monomer.

In the present disclosure, the second emulsifying agent preferably includes one or more selected from the group consisting of OP-10, sodium dodecyl sulfate, Peregal O, Span 60, Span 80. Tween 60, and Tween 80. In the present disclosure, a mass of the second emulsifying agent is preferably 5% to 15%, more preferably 7% to 12%, and further more preferably 8% to 10% of a total mass of the siloxane monomer and the hydroxyl-containing acrylate monomer.

In the present disclosure, a ratio of a mass of the water to a total mass of the siloxane monomer and the hydroxyl-containing acrylate monomer is preferably (0.5-1): 1, more preferably (0.6-0.9): 1, and further more preferably (0.7-0.8): 1.

In a specific embodiment of the present disclosure, the mixing of the siloxane monomer, the hydroxyl-containing acrylate monomer, the second emulsifying agent, and the water is preferably conducted as follows: a mixture of the siloxane monomer and the hydroxyl-containing acrylate is added to water with the second emulsifying agent, and a resulting mixture is stirred. The stirring is conducted at a temperature of preferably 30° C. to 50° C., more preferably 35° C. to 45° C., and further more preferably 40° C.; and the stirring is conducted at a stirring speed of preferably 800 r/min to 1,200 r/min, more preferably 900 r/min to 1.100 r/min, and further more preferably 1,000 r/min. The present disclosure has no special limitation on a time of the stirring, as long as the raw materials can be thoroughly mixed. In the present disclosure, the hydrolysis-polycondensation reaction is conducted at a temperature of preferably 30° C. to 50° C., more preferably 35° C. to 45° C., and further more preferably 40° C.; and the hydrolysis-polycondensation reaction is conducted for preferably 1 h to 6 h, more preferably 2 h to 3 h, and further more preferably 3 h to 4 h. In the present disclosure, the hydrolysis-polycondensation reaction is preferably conducted under stirring, and the stirring is conducted at a stirring speed of preferably 800 r/min to 1.200 r/min, more preferably 900 r/min to 1,100 r/min, and further more preferably 1,000 r/min. In the present disclosure, during the hydrolysis-polycondensation reaction, siloxane monomer molecules undergo sufficient hydrolysis and inter-hydroxyl condensation polymerization to form a relatively-stable hydroxyl-containing acrylate-siloxane shell emulsion.

In the present disclosure, after the styrene-acrylate core emulsion and the hydroxyl-containing acrylate-siloxane shell emulsion are obtained, the styrene-acrylate core emulsion, the hydroxyl-containing acrylate-siloxane shell emulsion, and a third initiator are mixed, and a grafting reaction is conducted to obtain the styrene acrylate-siloxane composite emulsion with a core-shell structure.

In the present disclosure, the third initiator preferably includes one or more selected from the group consisting of a persulfate, AIBN, and dimethyl azobisisobutyrate. In the present disclosure, the persulfate preferably includes one or more selected from the group consisting of SPS, APS, and KPS. In the present disclosure, a mass of the third initiator is preferably 0.2% to 0.5%, more preferably 0.25% to 0.45%, and further more preferably 0.3% to 0.4% of a mass of the hydroxyl-containing acrylate-siloxane shell emulsion. In the present disclosure, the third initiator is preferably used in the form of a third initiator aqueous solution, and the third initiator aqueous solution has a concentration of preferably 0.2 wt % to 1.0 wt %, more preferably 0.3 wt % to 0.7 wt %, and further more preferably 0.4 wt % to 0.5 wt %.

In the present disclosure, a mass ratio of the styrene-acrylate core emulsion to the hydroxyl-containing acrylate-siloxane shell emulsion is preferably 1:(1-5), more preferably 1:(2-4), and further more preferably 1:3.

In a specific embodiment of the present disclosure, the mixing is preferably conducted as follows: the hydroxyl-containing acrylate-siloxane shell emulsion is added to the styrene-acrylate core emulsion and then the third initiator is added. In the present disclosure, the mixing is preferably achieved through stirring, and the stirring is conducted at a stirring speed of preferably 150 r/min to 300 r/min and more preferably 200 r/min to 250 r/min. The present disclosure has no special limitation on a time of the stirring, as long as the raw materials can be thoroughly mixed. The mixing is conducted at a temperature of preferably 80° C. to 85° C., more preferably 81° C. to 84° C., and further more preferably 82° C. to 83° C.

In the present disclosure, the grafting reaction is conducted at a temperature of preferably 80° C. to 85° C., more preferably 81° C. to 84° C., and further more preferably 82° C. to 83° C.; and the grafting reaction is conducted for preferably 2 h to 3 h, more preferably 2 h to 2.5 h, and further more preferably 1.5 h to 3 h. In the present disclosure, during the grafting process, the styrene and acrylate molecules in the styrene-acrylate core emulsion undergo an addition polymerization reaction with the acrylate functional monomer molecules in the siloxane shell emulsion to obtain an emulsion particle in the emulsion, where the emulsion particle includes a styrene-acrylate core, a hydroxyl-containing acrylate grafting layer located on a surface of the styrene-acrylate core, and a siloxane shell located on a surface of the hydroxyl-containing acrylate grafting layer.

After the grafting reaction is completed, the present disclosure preferably further includes: cooling an emulsion obtained after the grafting reaction to 40° C. or lower to obtain a styrene acrylate-siloxane composite emulsion with a core-shell structure. The present disclosure has no special limitation on a method of the cooling, and a cooling method well known to those skilled in the art can be used, such as natural cooling. In the present disclosure, the cooling is preferably conducted under stirring, and the stirring is conducted at a stirring speed of preferably 150 r/min to 300 r/min and more preferably 200 r/min to 250 r/min. The present disclosure conducts the cooling under the above conditions, such that the dispersity and homogeneity of the core-shell structure in the composite emulsion can be maintained during the cooling process.

The present disclosure provides a styrene acrylate-siloxane composite emulsion with a core-shell structure prepared by the preparation method described in the above technical solution, including an emulsion particle, where the emulsion particle includes a styrene-acrylate core, a hydroxyl-containing acrylate grafting layer located on a surface of the styrene-acrylate core, and a siloxane shell located on a surface of the hydroxyl-containing acrylate grafting layer. In the present disclosure, the siloxane shell layer is a siloxane molecular network formed through condensation polymerization of the siloxane monomer. In the present disclosure, the hydroxyl-containing acrylate grafting layer is obtained through polymerization of a hydroxyl-containing acrylate monomer, and the hydroxyl-containing acrylate monomer in the hydroxyl-containing acrylate grafting layer is connected to the reaction and composite core structure is connected to the composite core structure and outermost siloxane shell layer through addition polymerization and condensation polymerization respectively.

The present disclosure provides use of the styrene acrylate-siloxane composite emulsion with a core-shell structure described in the above technical solution in the protection of a construction material. In the present disclosure, the building material preferably includes a cement-based material.

The technical solutions of the present disclosure are clearly and completely described below in conjunction with the examples of the present disclosure. Apparently, the described examples are merely some rather than all of the examples of the present disclosure. All other examples obtained by a person of ordinary skill in the art based on the examples of the present disclosure without creative efforts shall fall within the protection scope of the present disclosure.

Example 1

1) 6 g of styrene, 6 g of MMA, 8 g of BA, and 4 g of acrylic acid were mixed and thoroughly stirred to obtain a styrene-acrylate monomer mixture.
2) 50 mg of APS was dissolved in 10 g of deionized water to obtain an initiator aqueous solution.
3) 0.4 g of an OP-10 emulsifying agent and 0.4 g of sodium dodecyl sulfate were added to 20 g of deionized water, and a resulting mixture was thoroughly stirred; and the styrene-acrylate monomer mixture and the initiator aqueous solution were slowly added successively, and a resulting mixture was stirred at 78° C. and 300 r/min for 60 min to obtain a styrene-acrylate pre-emulsion.

4) 0.5 g of sodium bicarbonate was dissolved in 5 g of deionized water to obtain a pH buffer solution with a pH of 7.5, 20 wt % of the styrene-acrylate pre-emulsion was slowly added to the pH buffer solution, and a resulting mixture was stirred at 78° C. and 300 r/min until a bluish-white mixture was obtained; and the mixture was heated to 83° C., the remaining styrene-acrylate pre-emulsion and 5 g of the initiator aqueous solution were slowly added successively, and a resulting mixture was stirred at a stirring speed of 300 r/min for 1 h to obtain a styrene-acrylate core emulsion.

5) 1 g of OP-10, 0.5 g of Span 80, and 0.5 g of sodium dodecyl sulfate were added to 25 g of deionized water, a mixture of 5 g of vinyltriethoxysiloxane, 20 g of octyltriethoxysiloxane, and 3 g of HEA was slowly added, and a resulting mixture was stirred at 40° C. and 1,000 r/min for 2 h to obtain a hydroxyl-containing acrylate-siloxane shell emulsion.

6) The hydroxyl-containing acrylate-siloxane shell emulsion was slowly added to the styrene-acrylate core emulsion, 5 g of the initiator aqueous solution was supplemented, and a resulting mixture was stirred at 83° C. and 200 r/min for 2 h to obtain a composite emulsion, where a mass ratio of the hydroxyl-containing acrylate-siloxane shell emulsion to the styrene-acrylate core emulsion was 1:1.

7) Under stirring at 200 r/min, the composite emulsion was kept at 80° C. for 2 h and then naturally cooled to 40° C. or lower to obtain the styrene acrylate-siloxane composite emulsion with a core-shell structure.

Example 2

1) 5 g of styrene, 8 g of EA, 8 g of BMA, and 3 g of acrylic acid were mixed and thoroughly stirred to obtain a styrene-acrylate monomer mixture.

2) 60 mg of APS was dissolved in 10 g of deionized water to obtain an initiator aqueous solution.

3) 0.4 g of an OP-10 emulsifying agent and 0.4 g of sodium dodecyl sulfonate were added to 20 g of deionized water, and a resulting mixture was thoroughly mixed; and the styrene-acrylate monomer mixture and the initiator aqueous solution were slowly added successively, and a resulting mixture was stirred at 78° C. and 300 r/min for 60 min to obtain a styrene-acrylate pre-emulsion.

4) 0.5 g of sodium bicarbonate was dissolved in 5 g of deionized water to obtain a pH buffer solution with a pH of 7.5, 20 wt % of the styrene-acrylate pre-emulsion was slowly added to the pH buffer solution, and a resulting mixture was stirred at 78° C. and 300 r/min until a bluish-white mixture was obtained; and the mixture was heated to 83° C., the remaining styrene-acrylate pre-emulsion and 5 g of the initiator aqueous solution were slowly added successively, and a resulting mixture was stirred at a stirring speed of 300 r/min for 1 h to obtain a styrene-acrylate core emulsion.

5) 1 g of OP-10, 0.5 g of Tween 80, and 0.5 g of sodium dodecyl sulfonate were added to 25 g of deionized water, a mixture of 5 g of vinyltriethoxysiloxane, 20 g of octyltriethoxysiloxane, and 3 g of HPA was slowly added, and a resulting mixture was stirred at 40° C. and 1,000 r/min for 2 h to obtain a hydroxyl-containing acrylate-siloxane shell emulsion.

6) The hydroxyl-containing acrylate-siloxane shell emulsion was slowly added to the styrene-acrylate core emulsion, 4 g of the initiator aqueous solution was supplemented, and a resulting mixture was stirred at 83° C. and 200 r/min for 2 h to obtain a composite emulsion, where a mass ratio of the hydroxyl-containing acrylate-siloxane shell emulsion to the styrene-acrylate core emulsion was 1:2.

7) Under stirring at 200 r/min, the composite emulsion was kept at 80° C. for 2 h and then slowly cooled to 40° C. or lower to obtain the styrene acrylate-siloxane composite emulsion with a core-shell structure.

Example 3

1) 6 g of styrene, 6 g of MMA, 10 g of BMA, and 2 g of acrylic acid were mixed and thoroughly stirred to obtain a styrene-acrylate monomer mixture.

2) 50 mg of APS was dissolved in 10 g of deionized water to obtain an initiator aqueous solution.

3) 0.4 g of an OP-10 emulsifying agent and 0.4 g of sodium dodecyl sulfate were added to 20 g of deionized water, and a resulting mixture was thoroughly mixed; and the styrene-acrylate monomer mixture and the initiator aqueous solution were slowly added successively, and a resulting mixture was stirred at 78° C. and 300 r/min for 60 min to obtain a styrene-acrylate pre-emulsion.

4) 0.5 g of sodium bicarbonate was dissolved in 5 g of deionized water to obtain a pH buffer solution with a pH of 7.5, 20 wt % of the styrene-acrylate pre-emulsion was slowly added to the pH buffer solution, and a resulting mixture was stirred at 78° C. and 300 r/min until a bluish-white emulsion was obtained; and the mixture was heated to 83° C., the remaining styrene-acrylate pre-emulsion and 5 g of the initiator aqueous solution were slowly added successively, and a resulting mixture was stirred at a stirring speed of 300 r/min for 1 h to obtain a styrene-acrylate core emulsion.

5) 1 g of OP-10, 0.5 g of Span 680, and 0.5 g of sodium dodecyl sulfate were added to 25 g of deionized water, a mixture of 5 g of vinyltriethoxysiloxane, 20 g of octyltrimethoxysiloxane, and 4 g of HPA was slowly added, and a resulting mixture was stirred at 40° C. and 1.000 r/min for 2 h to obtain a hydroxyl-containing acrylate-siloxane shell emulsion.

6) The hydroxyl-containing acrylate-siloxane shell emulsion was slowly added to the styrene-acrylate core emulsion, 4 g of the initiator aqueous solution was supplemented, and a resulting mixture was stirred at 83° C. and 200 r/min for 2 h to obtain a composite emulsion, where a mass ratio of the hydroxyl-containing acrylate-siloxane shell emulsion to the styrene-acrylate core emulsion was 1:3.

7) Under stirring at 200 r/min, the composite emulsion was kept at 80° C. for 2 h and then slowly cooled to 40° C. or lower to obtain the styrene acrylate-siloxane composite emulsion with a core-shell structure.

Example 4

1) 8 g of styrene, 6 g of MA, 8 g of EA, and 2 g of acrylic acid were mixed and thoroughly stirred to obtain a styrene-acrylate monomer mixture.

2) 40 mg of APS was dissolved in 10 g of deionized water to obtain an initiator aqueous solution.

3) 0.4 g of an OP-10 emulsifying agent and 0.4 g of SDBS were added to 20 g of deionized water, then the styrene-acrylate monomer mixture and the initiator aqueous solution were slowly added successively, and a resulting mixture was stirred at 78° C. and 300 r/min for 60 min to obtain a styrene-acrylate pre-emulsion.

4) 0.5 g of sodium bicarbonate was dissolved in 5 g of deionized water to obtain a pH buffer solution with a pH of 7.5, 20 wt % of the styrene-acrylate pre-emulsion was slowly added to the pH buffer solution, and a resulting mixture was stirred at 78° C. and 300 r/min until a bluish-white mixture was obtained; and the mixture was heated to 83° C., the remaining styrene-acrylate pre-emulsion and 5 g of the initiator aqueous solution were slowly added successively, and a resulting mixture was stirred at a stirring speed of 300 r/min for 1 h to obtain a styrene-acrylate core emulsion.

5) 1 g of OP-10, 0.5 g of Tween 60, and 0.5 g of SDBS were added to 25 g of deionized water, a mixture of 5 g of vinyltriethoxysiloxane, 20 g of octyltrimethoxysiloxane, and 4 g of HEA was slowly added, and a resulting mixture was stirred at 40° C. and 1,000 r/min for 2 h to obtain a hydroxyl-containing acrylate-siloxane shell emulsion.

6) The hydroxyl-containing acrylate-siloxane shell emulsion was slowly added to the styrene-acrylate core emulsion, 5 g of the initiator aqueous solution was supplemented, and a resulting mixture was stirred at 83° C. and 200 r/min for 2 h to obtain a composite emulsion, where a mass ratio of the hydroxyl-containing acrylate-siloxane shell emulsion to the styrene-acrylate core emulsion was 1:4.

7) Under stirring at 200 r/min, the composite emulsion was kept at 80° C. for 2 h and then slowly cooled to 40° C. or lower to obtain the styrene acrylate-siloxane composite emulsion with a core-shell structure.

Comparative Example 1

A styrene-acrylate core emulsion was prepared according to the method in Example 1 except that, steps 5) to 7) were omitted; and in step 4), 5 g of the initiator aqueous solution was added, and then a resulting mixture was stirred for 2.5 h and heated at 80° C. for 1 h to obtain a pure styrene-acrylate emulsion.

Comparative Example 2

A styrene-acrylate pre-emulsion was prepared according to the process of steps 1) to 3) in Example 1.

5) The styrene-acrylate pre-emulsion and the siloxane mixed solution were mixed and stirred at 60° C. and 1,000 r/min for 4 h to allow a copolymerization reaction to obtain a styrene acrylate-siloxane composite copolymer emulsion, where a mass ratio of the styrene-acrylate pre-emulsion to the siloxane mixed solution was 1:1.

Comparative Example 3

A styrene acrylate-siloxane composite copolymer emulsion was prepared according to the method in Comparative Example 2 except that, a mass ratio of the styrene-acrylate pre-emulsion to the siloxane mixed solution was 1:4.

Test Example 1

(1) Appearance and Microstructures of Styrene Acrylate-Siloxane Composite Emulsions Each with a Core-Shell Structure FIG. 1 shows appearance pictures of the emulsions prepared in Examples 1 to 4 and Comparative Examples 1 to 3, and it can be seen from FIG. 1 that the styrene acrylate-siloxane composite emulsion with a core-shell structure prepared by the present disclosure does not undergo flocculation, layering, or segregation, and has prominent homogeneity and stability.

Figure 2:
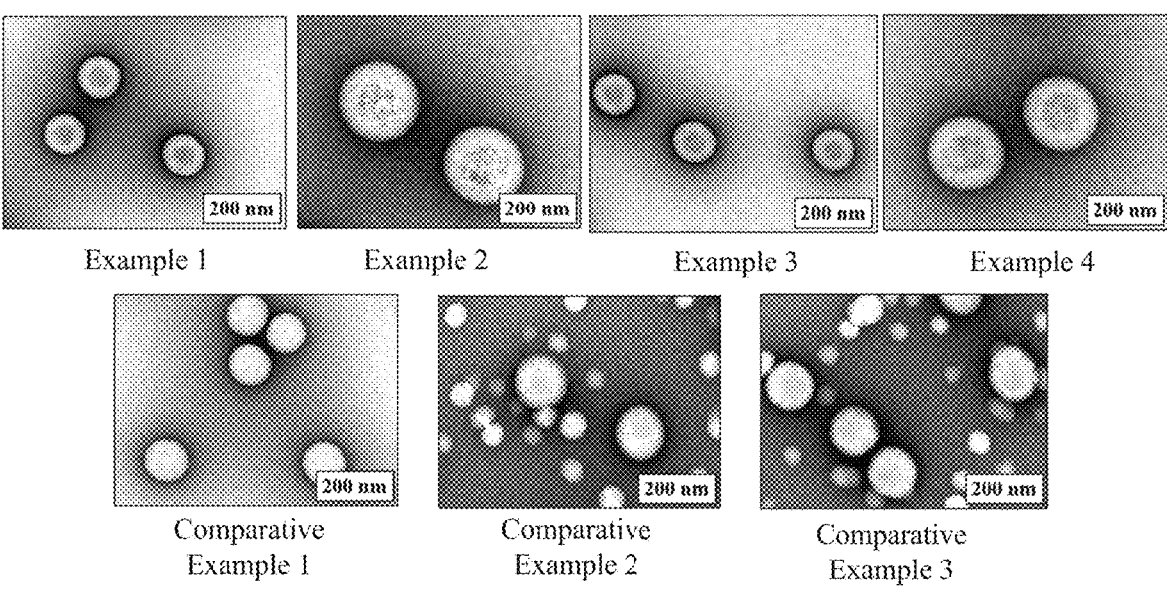
FIG. 2 shows transmission electron microscopy (TEM) images of the emulsions prepared in Examples 1 to 4 and Comparative Examples 1 to 3.

FIG. 2 shows TEM images of the emulsions prepared in Examples 1 to 4 and Comparative Examples 1 to 3, and it can be seen from FIG. 2 that the emulsions prepared in Examples 1 to 4 have significant core-shell structure characteristics, and the emulsion composite core-shell structures have a relatively-consistent particle size, indicating that the synthesis method adopted in the present disclosure can effectively graft the styrene-acrylate component and the siloxane component together to form an ordered and stable core-shell structure system.

(2) Basic Properties of Styrene Acrylate-Siloxane Composite Emulsions Each with a Core-Shell Structure The emulsions prepared in Examples 1 to 4 and Comparative Examples 1 to 3 were each coated on a surface of a specimen twice at an interval of no less than 6 h with a total amount of 600 g/m² to obtain a coating. Performance test results of the emulsions prepared in Examples 1 to 4 and Comparative Examples 1 to 3 were illustrated in Tables 1 to 3.

TABLE 1

Basic performance parameters of the emulsions prepared in Examples 1 to 4 and Comparative Examples 1 to 3

| | Example 1 | Example 2 | Example 3 | Example 4 | Comparative Example 1 | Comparative Example 2 | Comparative Example 3 |
|---|---|---|---|---|---|---|---|
| Surface dry time | 6 h | 6 h | 6 h | 8 h | 4 h | 8 h | 8 h |
| Actual dry time | 12 h | 12 h | 12 h | 14 h | 10 h | 18 h | 24 h |
| Solid content | 48.7% | 48.5% | 47.9% | 47.4% | 47.2% | 43.8% | 41.8% |
| Gelation ratio | 1.4% | 1.5% | 1.2% | 1.1% | 2.8% | 2.1% | 1.7% |
| Monomer conversion ratio | 86.7% | 88.2% | 87.6% | 87.7% | 87.6% | 84.6% | 85.1% |
| Grafting retio | 86.6% | 87.5% | 88.1% | 88.4% | — | 81.3% | 83.8% |

4) 5 g of vinyltriethoxysiloxane, 20 g of octyltriethoxysiloxane, 3 g of HPA, 1 g of OP-10, 0.5 g of Tween 80, 0.5 g of sodium dodecyl sulfonate, and 25 g of deionized water were thoroughly mixed to obtain a siloxane mixed solution.

It can be seen from Table 1 that the surface dry time and actual dry time of each of Examples 1 to 4 are longer than that of Comparative Example 1, but both are shorter than that of Comparative Examples 2 and 3; and a solid content of each of Examples 1 to 4 is greater than 37%, and is higher than that of Comparative Examples 1 to 3, indicating that the styrene-acrylate core structure in the styrene acrylate-siloxane composite emulsion with a core-shell structure prepared by the present disclosure has prominent film-forming performance. The gelation ratios of Examples 1 to 4 can all be maintained at 1.5% or lower, indicating that the styrene acrylate-siloxane composite emulsion with a core-shell structure prepared by the present disclosure does not undergo flocculation or sudden polymerization during the synthesis process. The monomer conversion ratios and grafting ratios of Examples 1 to 4 can be maintained at 86.5% or higher, indicating that the styrene acrylate-siloxane composite emulsion with a core-shell structure prepared by the present disclosure can significantly improve the polymerization and bonding reactions between the styrene-acrylate and the siloxane components.

(3) Stability of Styrene Acrylate-Siloxane Composite Emulsions Each with a Core-Shell Structure The centrifugal stability was tested as follows: An emulsion was centrifuged for 5 min in a centrifuge at a stirring speed of 2,000 r/min to observe the centrifugal stability of the emulsion.

The dilution stability was tested as follows: An emulsion was diluted with deionized water as a solvent to a concentration of 2% to observe the dilution stability of the emulsion.

The $Ca^{2+}$ stability was tested as follows: An emulsion was diluted with a 5% $CaCl_2$ solution to a concentration of 10% to observe the $Ca^{2+}$ stability.

The low-temperature stability was tested as follows: An emulsion was allowed to stand at 0° C. for 18 h to observe the low-temperature stability of the emulsion.

The high-temperature stability was tested as follows: An emulsion was allowed to stand at 60° C. for 24 h to observe the high-temperature stability of the emulsion.

Stability test results were indicated in Table 2.

TABLE 2

Stability of the emulsions prepared in Examples 1 to 4 and Comparative Examples 1 to 3

| | Example 1 | Example 2 | Example 3 | Example 4 | Comparative Example 1 | Comparative Example 2 | Comparative Example 3 |
|---|---|---|---|---|---|---|---|
| Centrifugal stability | Excellent | Relatively excellent | Relatively excellent | Relatively excellent | Relatively excellent | Poor | Poor |
| Dilution stability | Excellent | Excellent | Excellent | Relatively excellent | Excellent | Relatively excellent | Relatively excellent |
| $Ca^{2+}$ stability | Excellent | Excellent | Relatively excellent | Relatively excellent | Excellent | Poor | Poor |
| Low-temperature stability | Relatively excellent | Relatively excellent | Relatively excellent | Relatively excellent | Poor | Poor | Poor |
| High-temperature stability | Excellent | Excellent | Excellent | Relatively excellent | Relatively excellent | Relatively excellent | Poor |

It can be seen from Table 2 that the styrene acrylate-siloxane composite emulsion with a core-shell structure prepared in each of Examples 1 to 4 shows better stability than the products in Comparative Examples 1 to 3, that is, the styrene acrylate-siloxane composite emulsion with a core-shell structure has superior centrifugal stability, dilution stability, $Ca^{2+}$ stability, low-temperature stability, and high-temperature stability, indicating that the components of the styrene acrylate-siloxane composite emulsion with a core-shell structure prepared by the present disclosure have excellent synergistic working performance.

(4) Particle Size, Dispersity, and Rheological Behaviors of Styrene Acrylate-Siloxane Composite Emulsions Each with a Core-Shell Structure The particle size distribution, PDI value, and Zeta potential of a composite emulsion were determined by an LT-2800 laser particle analyzer. The PDI value and Zeta potential could be used to characterize the dispersity of particles in an emulsion. A shear viscosity of an emulsion was determined by a DV-2 Visco QC viscometer at a shear rate of 50 r/min to 1.000 r/min. A viscosity value was used to characterize the rheological properties of an emulsion.

The particle size, dispersity, and rheological properties of the emulsions prepared in Examples 1 to 4 and Comparative Examples 1 to 3 were illustrated in Table 3.

TABLE 3

| | Example 1 | Example 2 | Example 3 | Example 4 | Comparative Example 1 | Comparative Example 2 | Comparative Example 3 |
|---|---|---|---|---|---|---|---|
| Particle size, dispersity, and rheological behaviors of the emulsions prepared in Examples 1 to 4 and Comparative Examples 1 to 3 | | | | | | | |
| Average particle size/nm | 158 | 167 | 176 | 182 | 172 | 204 | 209 |
| PDI | 0.288 | 0.293 | 0.317 | 0.324 | 0.267 | 0.337 | 0.385 |
| Zeta potential/-mV | 38.38 | 36.45 | 35.55 | 33.11 | 33.26 | 30.22 | 26.14 |
| Viscosity/mPa · s$^{-1}$ | 186.5 | 171.9 | 164.4 | 157.6 | 256.5 | 147.3 | 134.5 |

It can be seen from Table 3 that the product in each of Examples 1 to 4 has an average particle size of less than 200 nm, indicating that the styrene acrylate-siloxane composite emulsion with a core-shell structure prepared by the present disclosure meets the basic requirements of permeable emulsions and can fully penetrate into capillary pores of a cement-based material. A PDI homogeneity index of each of Examples 1 to 4 is less than 0.33, indicating that the styrene acrylate-siloxane composite emulsion with a core-shell structure prepared by the present disclosure has high homogeneity. The absolute values of Zeta potential of Examples 1 to 4 are significantly higher than that of Comparative Examples 1 to 3, indicating that the styrene acrylate-siloxane composite emulsion with a core-shell structure prepared by the present disclosure has superior dispersity and stability. In addition, the viscosity of each of Examples 1 to 4 is lower than the viscosity of the pure styrene-acrylate emulsion in Comparative Example 1 and slightly higher than the viscosity of each of Comparative Examples 2 and 3, indicating that the styrene acrylate-siloxane composite emulsion with a core-shell structure prepared by the present disclosure exhibits both high adhesion performance and high levelling performance.

(5) Hydrophobicity and Water Resistance of Styrene Acrylate-Siloxane Composite Emulsions Each with a Core-Shell Structure (5.1) Static Surface Contact Angle The emulsions prepared in Examples 1 to 4 and Comparative Examples 1 to 3 were each coated on a surface of a cement specimen twice at an interval of no less than 6 h with a total amount of 600 g/m$^2$ to obtain a coating, and a static contact angle of water droplets on a surface of the coating was measured with a static surface contact angle meter. Test results were shown in FIG. 3 and Table 4.

Figure 3:
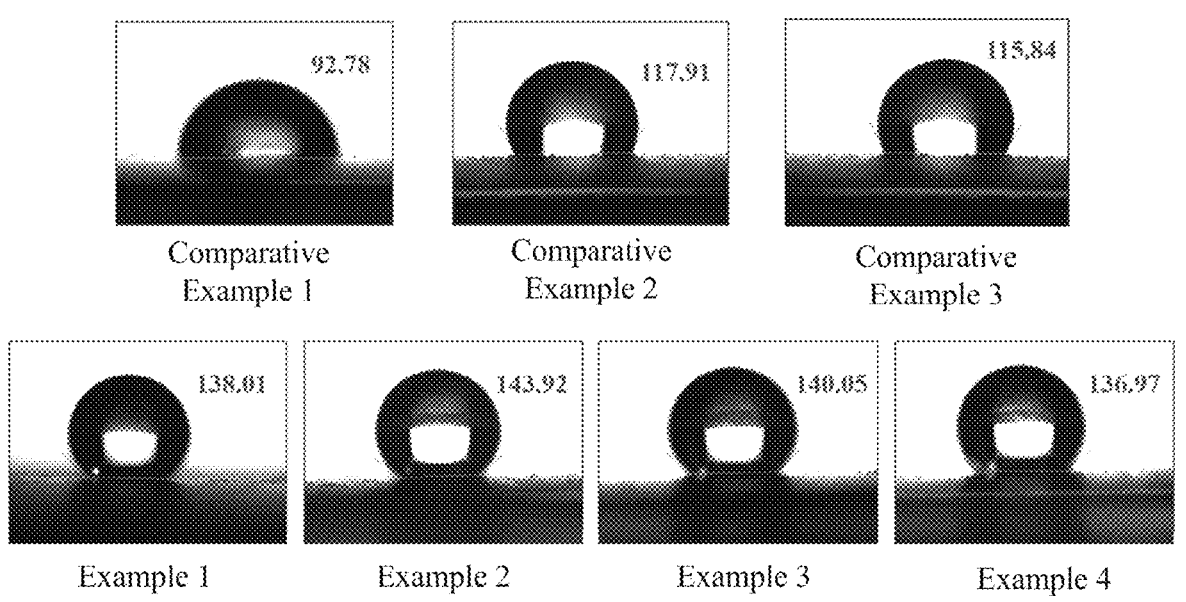
FIG. 3 shows surface water contact angle test results of cement paste specimens coated with the emulsions prepared in Examples 1 to 4 and Comparative Examples 1 to 3.

FIG. 3 shows static contact angle test results of coatings formed by the emulsions prepared in Examples 1 to 4 and Comparative Examples 1 to 3 on a surface of a cement specimen.

TABLE 4

| | Example 1 | Example 2 | Example 3 | Example 4 | Comparative Example 1 | Comparative Example 2 | Comparative Example 3 |
|---|---|---|---|---|---|---|---|
| Static contact angles of surface coatings of cement specimens | | | | | | | |
| Contact angle/° | 138.01 | 143.92 | 140.05 | 136.97 | 92.78 | 117.91 | 115.84 |

It can be seen from FIG. 3 and Table 4 that, compared with Comparative Examples 1 to 3, a static contact angle on a surface of a cement paste specimen obtained from each of Examples 1 to 4 can be increased to 135° or higher, indicating superior hydrophobicity. It can be known that the styrene acrylate-siloxane composite emulsion with a core-shell structure prepared by the present disclosure can fully improve a molecular configuration of the siloxane, such that the long hydrophobic alkyl chains in the outer layer can fully stretch.

(5.2) Static Capillary Water Absorption Rate

A non-cast surface of a dry concrete specimen was selected as a coating surface, the emulsions prepared in Examples 1 to 4 and Comparative Examples 1 to 3 were each coated on the coating surface twice at an interval of no less than 6 h with a total amount of 600 g/m$^2$, and four sides were sealed with an epoxy resin. The specimen was placed in distilled water with the coating surface facing downward and a bottom surface about 5 mm away from a water level, and the static capillary water absorption rate of the concrete specimen was tested at different water absorption time points. Test results were depicted in FIG. 4 and Table 5.

Figure 4:
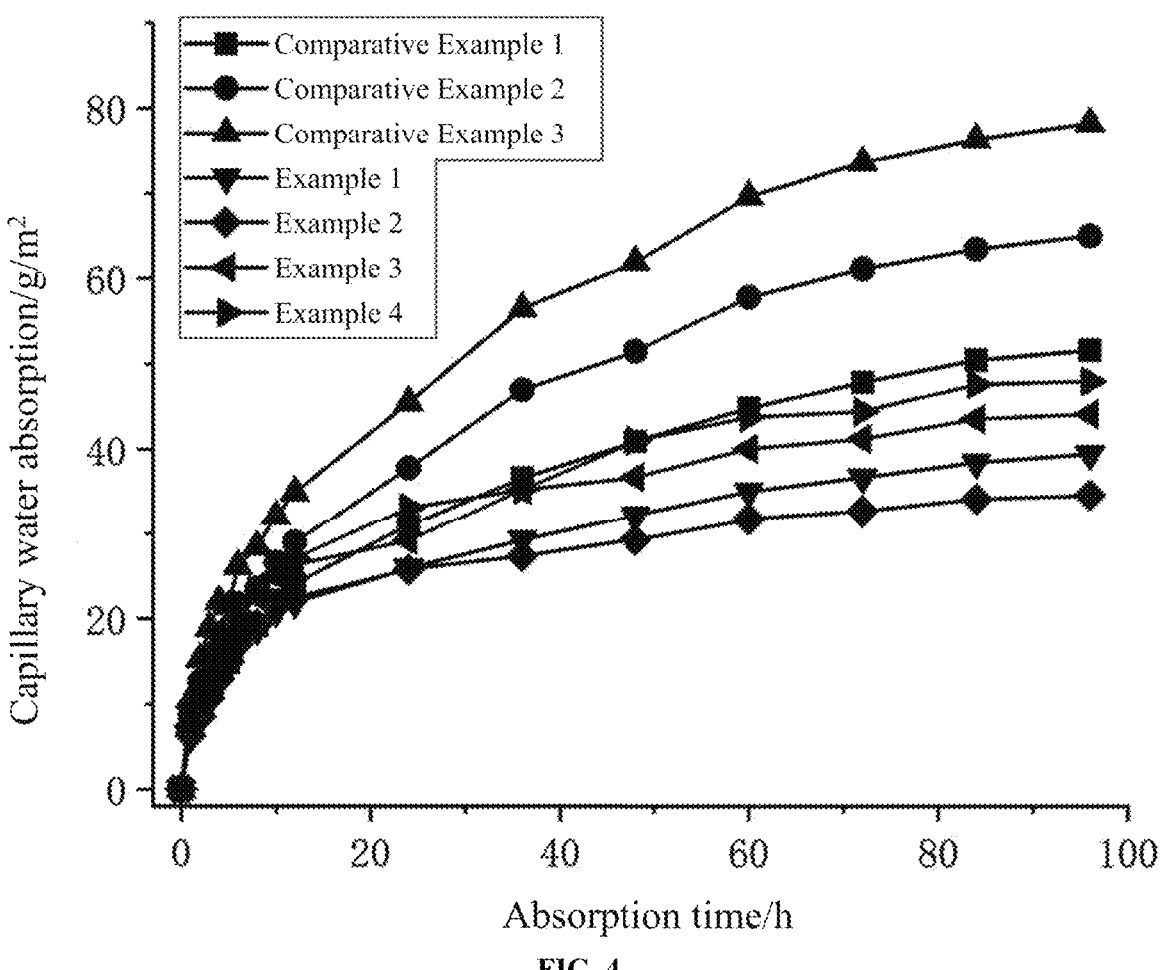
FIG. 4 shows capillary water absorption curves of concrete specimens coated with the emulsions prepared in Examples 1 to 4 and Comparative Examples 1 to 3.

FIG. 4 shows static capillary water absorption curves of concrete specimens.

TABLE 5

| Static capillary water absorption rates of concrete specimens at 24 h (g · m$^{-2}$h$^{-0.5}$) | | | | | | |
| --- | --- | --- | --- | --- | --- | --- |
| | Example 1 | Example 2 | Example 3 | Example 4 | Comparative Example 1 | Comparative Example 2 | Comparative Example 3 |
| Capillary water absorption rate | 17.4 | 16.8 | 19.2 | 21.2 | 23.7 | 28.7 | 31.6 |

It can be seen from FIG. 4 and Table 5 that the concrete specimen coated with the styrene acrylate-siloxane composite emulsion with a core-shell structure prepared by the present disclosure has a static capillary water absorption rate that is greatly reduced compared with the concrete specimens coated with the emulsions prepared in Comparative Examples 1 to 3. Compared with the pure styrene-acrylate emulsion, the static capillary water absorption rates of Examples 1 to 4 are decreased by 26.6%, 29.1%, 19.0%, and 10.5%, respectively, where the static capillary water absorption rate of Example 2 is decreased the most. It can be known that the styrene acrylate-siloxane composite emulsion with a core-shell structure prepared by the present disclosure enables an effective grafting and bonding relationship between the styrene-acrylate and the siloxane, thereby endowing a concrete specimen with superior water resistance.

(6) Chloride and Sulfate Corrosion Resistance of Styrene Acrylate-Siloxane Composite Emulsions Each with a Core-Shell Structure A non-cast surface of a dry concrete specimen was selected as a coating surface, the emulsions prepared in Examples 1 to 4 and Comparative Examples 1 to 3 were each coated on the coating surface twice at an interval of no less than 6 h with a total amount of 600 g/m$^2$, and four sides were sealed with an epoxy resin. Concrete specimens were soaked in 10% NaCl and Na$_2$SO$_4$ solutions, respectively. The penetration of chloride and sulfate ions was tested on day 50, and test results were indicated in Table 6.

emulsion with a core-shell structure can effectively block or prolong a transmission path of corrosive ions, reduce an osmotic pressure of ions in capillary channels, and effectively inhibit the diffusion and transmission of chloride and sulfate ions in capillary channels and cracks inside a concrete.

(7) SEM Microscopic Inspection Test

The emulsions prepared in Examples 1 to 4 and Comparative Examples 1 to 3 were each coated on a surface of a cement specimen twice at an interval of no less than 6 h with a total amount of 600 g/m$^2$ to obtain a coating, and SEM was used to observe the internal morphology of each cement specimen.

Figure 5:
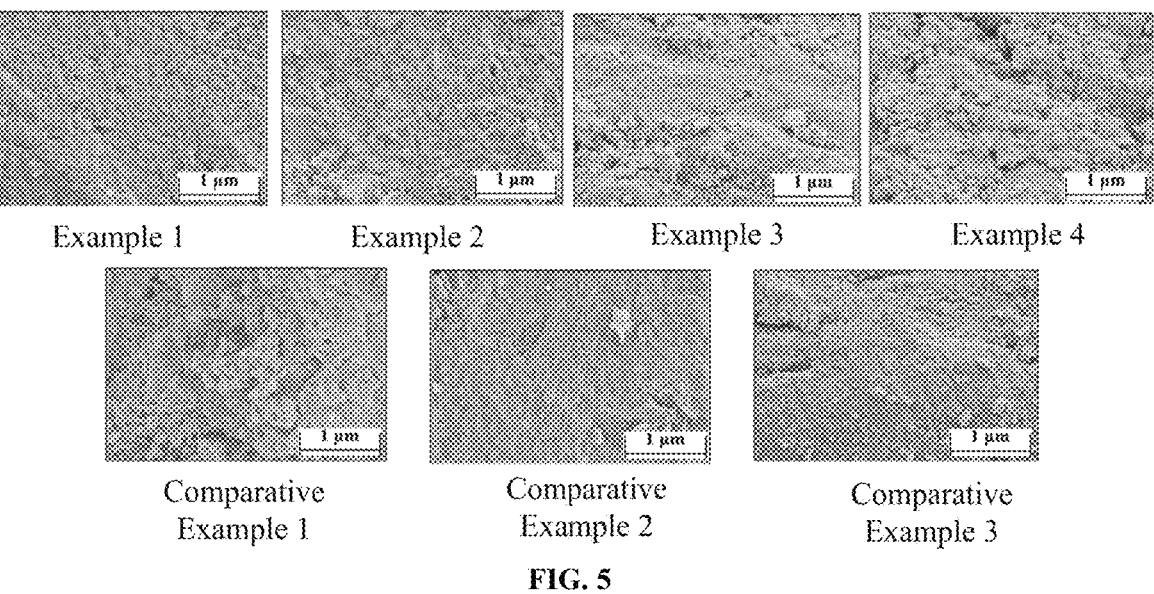
FIG. 5 shows scanning electron microscopy (SEM) images of inner surfaces of cement paste specimens coated with the emulsions prepared in Examples 1 to 4 and Comparative Examples 1 to 3.

FIG. 5 shows SEM images of inner surfaces of cement paste specimens coated with the emulsions prepared in Examples 1 to 4 and Comparative Examples 1 to 3. It can be seen from FIG. 5 that there are many microscopic particles on an inner surface of the cement paste specimen obtained from Comparative Example 1, which is the morphology of a cement hydration product, indicating that the pure styrene-acrylate emulsion mainly forms a dense protective film on the surface of the cement substrate and rarely penetrates into the cement substrate. In Comparative Examples 2 and 3, due to the presence of siloxane in the copolymer emulsion, a small number of sporadic flocculent and clustered structures appear on the inner surface of the cement specimen. The inner surface of the cement specimen treated by the styrene acrylate-siloxane composite emulsion with a core-shell structure is covered with a flocculent structure at a specified

TABLE 6

| Corrosion amounts of chloride and sulfate ions (g · m$^{-2}$) | | | | | | |
| --- | --- | --- | --- | --- | --- | --- |
| | Example 1 | Example 2 | Example 3 | Example 4 | Comparative Example 1 | Comparative Example 2 | Comparative Example 3 |
| Cl$^-$ corrosion amount | 353 | 325 | 388 | 430 | 502 | 608 | 647 |
| SO$_4{}^{2-}$ corrosion amount | 315 | 272 | 301 | 327 | 367 | 412 | 428 |

It can be seen from Table 6 that the chloride ion corrosion amount and the sulfate ion corrosion amount of the concrete specimen treated by the styrene acrylate-siloxane composite emulsion with a core-shell structure are greatly decreased. Compared with the concrete specimen coated with the pure styrene-acrylate emulsion, the chloride ion corrosion amounts of Examples 1 to 4 are respectively decreased by 9.8%, 35.3%, 22.7%, and 14.3%, and the sulfate ion corrosion amounts are respectively decreased by 6.0%, 25.9%, 18.0%, and 10.9%, where the chloride ion and sulfate ion corrosion amounts of Example 2 are decreased the most. It indicates that a coating formed by the styrene acrylate-siloxane composite emulsion with a core-shell structure prepared by the present disclosure can endow a concrete specimen with excellent resistance to chloride and sulfate corrosion; and the styrene acrylate-siloxane composite thickness, and the flocculent structure further develops and merges to form a thick and complete clustered structure, which is a continuous dense and hydrophobic protective film formed on a surface of a cement hydration product after the siloxane emulsion penetrates into a cement substrate. With the increase of a core-shell ratio, a proportion of the siloxane component in the emulsion with a core-shell structure increases, and the siloxane in the shell layer will form a dense secondary hydration product deposition layer on the surface of the cement hydration product, such that the entire inner surface of the cement specimen is completely covered by a flocculent product.

(8) Acid and Alkali Corrosion Resistance of Styrene Acrylate-Siloxane Composite Emulsions Each with a Core-Shell Structure The emulsions prepared in Examples 1 to 4 and Comparative Examples 1 to 3 were each coated on a surface of a cement specimen twice at an interval of no less than 6 h with a total amount of 600 g/m², then resulting specimens were soaked for 72 h in a dilute hydrochloric acid solution with a pH of 3 and a sodium hydroxide solution with a pH of 12 respectively, and a mass loss rate was determined. A surface adhesion strength and a pencil hardness of a surface coating of a cement specimen were measured by an adhesion strength tester and a pencil hardness tester, respectively. Test results were illustrated in Table 7 and Table 8.

TABLE 7

| Mass loss rate of each emulsion film under acid and alkali corrosion | | | | | | |
|---|---|---|---|---|---|---|
| | Example 1 | Example 2 | Example 3 | Example 4 | Comparative Example 1 | Comparative Example 2 | Comparative Example 3 |
| Acid corrosion | 32% | 34% | 37% | 38% | 46% | 53% | 54% |
| Alkali corrosion | 14% | 15% | 18% | 20% | 24% | 22% | 25% |

It can be seen from Table 7 that the mass loss rates of the emulsion films of Examples 1 to 4 under acid and alkali corrosion are lower than that of Comparative Examples 1 to 3, indicating that a coating formed by the styrene acrylate-siloxane composite emulsion with a core-shell structure prepared by the present disclosure has superior acid and alkali corrosion resistance, where the alkali corrosion resistance is more outstanding; and its mass loss rate can be controlled at 20% or lower.

TABLE 8

| Adhesion strength and pencil hardness of a surface coating of each cement specimen under acid and alkali corrosion | | | | | | |
|---|---|---|---|---|---|---|
| | Example 1 | Example 2 | Example 3 | Example 4 | Comparative Example 1 | Comparative Example 2 | Comparative Example 3 |
| Surface adhesion strength/MPa | | | | | | | |
| Acid corrosion | 4.3 | 4.3 | 4.0 | 3.9 | 3.8 | 3.5 | 3.2 |
| Alkali corrosion | 7.2 | 7.0 | 6.6 | 6.3 | 6.5 | 5.9 | 5.8 |
| Pencil hardness | | | | | | | |
| Acid corrosion | B | B | 2B | 2B | 3B | 3B | 4B |
| Alkali corrosion | B | B | B | B | 2B | 2B | 2B |

It can be seen from Table 8 that, compared with the pure styrene-acrylate emulsion and the copolymer emulsion in the comparative examples, the styrene acrylate-siloxane composite emulsions each with a core-shell structure obtained in Examples 1 to 4 show a high surface adhesion strength to a cement-based material under acid and alkali corrosion, which can ensure that the coating formed by the styrene acrylate-siloxane composite emulsion with a core-shell structure can provide a continuous stable protective effect for a cement substrate in acid and alkali corrosion environments. In addition, the emulsion films of Comparative Examples 1 to 3 have a relatively-low pencil hardness under acid and alkali corrosion, with a pencil hardness grade of no higher than 2B; and the coating formed by the styrene acrylate-siloxane composite emulsion with a core-shell structure in each of Examples 1 to 4 exhibits a significantly-improved pencil hardness. The alkali corrosion resistance of the coating formed by the styrene acrylate-siloxane com-posite emulsion with a core-shell structure is better than its acid corrosion resistance, and the surface adhesion strength and pencil hardness of the coating formed by the styrene acrylate-siloxane composite emulsion with a core-shell structure under acid corrosion are significantly increased.

(9) Aging Resistance of Styrene Acrylate-Siloxane Composite Emulsions Each with a Core-Shell Structure The emulsions prepared in Examples 1 to 4 and Comparative Examples 1 to 3 were each poured into a polytet-rafluoroethylene (PTFE) strip mold, dried at 40° C. for 48 h, and demolded to obtain an emulsion film sample with a size of 15 mm×50 mm×2 mm. The prepared emulsion films were continuously irradiated for 72 h under artificial UV rays with an irradiance of 50 w/m² and a wavelength of 254 nm, and then a surface gloss loss rate and a crosslinking density loss rate were measured. Measurement results were indicated in Table 9.

TABLE 9

| | | | | | Comparative | Comparative | Comparative |
|---|---|---|---|---|---|---|---|
| Surface gloss loss ratios and crosslinking density loss ratios of emulsion films | | | | | | | |
| | Example 1 | Example 2 | Example 3 | Example 4 | Example 1 | Example 2 | Example 3 |
| Gloss loss rate | 62.5% | 64.2% | 67.1% | 67.3% | 84.3% | 72.9% | 77.8% |
| Crosslinking density loss rate | 17.6% | 17.7% | 18.3% | 18.6% | 22.2% | 20.3% | 20.7% |

It can be seen from Table 9 that the coating formed by the pure styrene-acrylate emulsion in Comparative Example 1 has poor anti-UV aging performance and a relatively-high surface gloss loss ratio and crosslinking density loss rate. The gloss loss ratio and crosslinking density loss ratio of the copolymer emulsions in Comparative Examples 2 and 3 are slightly reduced, indicating that the siloxane is conducive to the improvement of the aging resistance of the styrene-acrylate component. However, the gloss loss ratio and crosslinking density loss ratio of the coating formed by the styrene acrylate-siloxane composite emulsion with a core-shell structure obtained in each of Examples 1 to 4 are significantly reduced, where the surface gloss loss ratio and crosslinking density loss ratio of Example 1 are the lowest, indicating the optimal aging resistance.

In summary, the styrene acrylate-siloxane composite emulsion with a core-shell structure prepared by the present disclosure has excellent water resistance, ionic corrosion resistance, acid and alkali corrosion resistance, and aging resistance, and can effectively inhibit and slow down the performance deterioration of cement-based materials and the steel bar corrosion in coastal environments.

The above are merely preferred implementations of the present disclosure. It should be noted that several improvements and modifications may further be made by a person of ordinary skill in the art without departing from the principle of the present disclosure, and such improvements and modifications should also be deemed as falling within the protection scope of the present disclosure.

What is claimed is:

1. A preparation method of a styrene acrylate-siloxane composite emulsion with a core-shell structure, comprising the following steps:

(1) mixing styrene, an acrylate monomer, a first emulsifying agent, a first initiator, and water to obtain a styrene-acrylate pre-emulsion; and premixing a part of the styrene-acrylate pre-emulsion with an alkaline reagent, adding a remaining styrene-acrylate pre-emulsion and a second initiator, and mixing to obtain a styrene-acrylate core emulsion;

(2) mixing a siloxane monomer, a hydroxyl-containing acrylate monomer, a second emulsifying agent, and water, and conducting a hydrolysis-polycondensation reaction to obtain a hydroxyl-containing acrylate-siloxane shell emulsion; and (3) mixing the styrene-acrylate core emulsion, the hydroxyl-containing acrylate-siloxane shell emulsion, and a third initiator, and conducting a grafting reaction to obtain the styrene acrylate-siloxane composite emulsion with the core-shell structure;

wherein steps (1) and (2) are conducted in any order; and wherein a mass of the styrene is 10% to 30% of a total mass of the styrene and the acrylate monomer.

2. The preparation method according to claim 1, wherein the acrylate monomer comprises one or more selected from the group consisting of methyl acrylate (MA), methyl methacrylate (MMA), ethyl acrylate (EA), butyl acrylate (BA), butyl methacrylate (BMA), and acrylic acid.

3. The preparation method according to claim 1, wherein the first emulsifying agent comprises one or more selected from the group consisting of octylphenol polyoxyethylene ether (OP-10), sodium dodecyl sulfate, sodium dodecyl sulfonate, and sodium dodecyl benzene sulfonate (SDBS), and a mass of the first emulsifying agent is 2% to 5% of a total mass of the styrene and the acrylate monomer.

4. The preparation method according to claim 1, wherein the first initiator comprises one or more selected from the group consisting of a persulfate, azodiisobutyronitrile (AIBN), and dimethyl azobisisobutyrate, and a mass of the first initiator is 0.2% to 0.7% of a mass of the styrene-acrylate pre-emulsion.

5. The preparation method according to claim 1, wherein a mass of the part of the styrene-acrylate pre-emulsion is 10% to 30% of a total mass of the styrene-acrylate pre-emulsion.

6. The preparation method according to claim 1, wherein the second initiator comprises one or more selected from the group consisting of a persulfate, azodiisobutyronitrile (AIBN), and dimethyl azobisisobutyrate, and a mass of the second initiator is 0.3% to 0.8% of a mass of the styrene-acrylate pre-emulsion.

7. The preparation method according to claim 1, wherein the siloxane monomer comprises one or more selected from the group consisting of octyl siloxane, dodecyl siloxane, and cetyl siloxane.

8. The preparation method according to claim 7, wherein the octyl siloxane comprises n-octyltrimethoxysiloxane and/or n-octyltriethoxysiloxane, the dodecyl siloxane comprises dodecyltrimethoxysiloxane and/or dodecyltriethoxysiloxane, and the cetyl siloxane comprises cetyltrimethoxysiloxane and/or cetyltriethoxysiloxane.

9. The preparation method according to claim 1, wherein the hydroxyl-containing acrylate monomer comprises hydroxyethyl acrylate (HEA) and/or hydroxypropyl acrylate (HPA); and a mass of the hydroxyl-containing acrylate monomer is 20% to 50% of a mass of the siloxane monomer.

10. The preparation method according to claim 1, wherein the second emulsifying agent comprises one or more selected from the group consisting of octylphenol polyoxyethylene ether (OP-10) and sodium dodecyl sulfate, and a mass of the second emulsifying agent is 5% to 15% of a total mass of the siloxane monomer and the hydroxyl-containing acrylate monomer.

11. The preparation method according to claim 1, wherein the hydrolysis-polycondensation reaction is conducted at 30° C. to 50° C. for 1 h to 6 h.

12. The preparation method according to claim 1, wherein a mass ratio of the styrene-acrylate core emulsion to the hydroxyl-containing acrylate-siloxane shell emulsion is 1:(1-5).

13. The preparation method according to claim 1, wherein the third initiator comprises one or more selected from the group consisting of a persulfate, azodiisobutyronitrile (AIBN), and dimethyl azobisisobutyrate, and a mass of the third initiator is 0.2% to 0.5% of a mass of the hydroxyl-containing acrylate-siloxane shell emulsion.

14. The preparation method according to claim 1, wherein the grafting reaction is conducted at 80° C. to 85° C. for 1.5 h to 3 h.

15. The preparation method according to claim 6, wherein the hydrolysis-polycondensation reaction is conducted at 30° C. to 50° C. for 1 h to 6 h.

16. The preparation method according to claim 7, wherein the hydrolysis-polycondensation reaction is conducted at 30° C. to 50° C. for 1 h to 6 h.

\*　\*　\*　\*　\*